May 16, 1967 H. W. SIMPSON 3,319,491
HEAVY DUTY PLANETARY TRANSMISSION
Filed Dec. 24, 1963 6 Sheets-Sheet 5

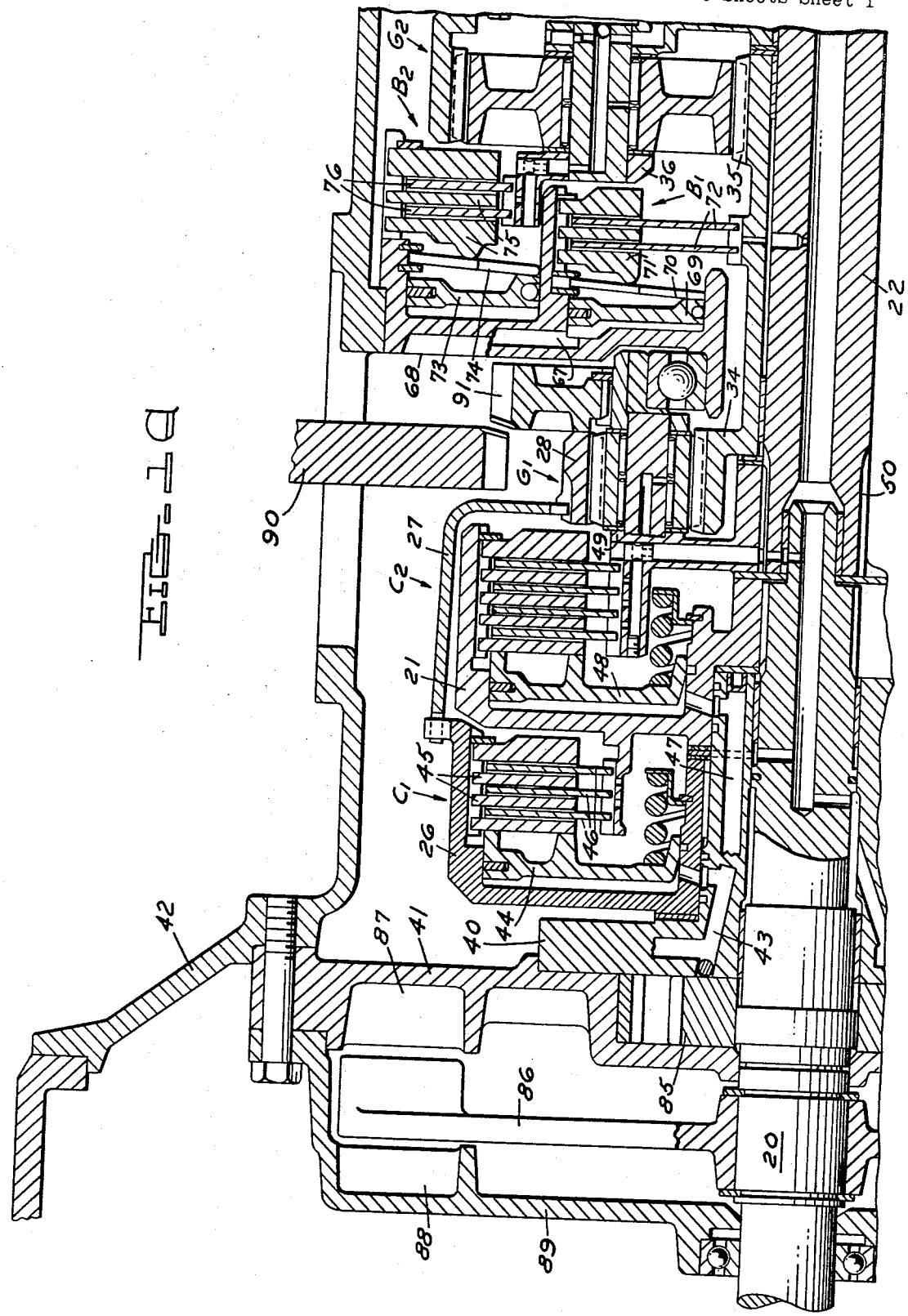

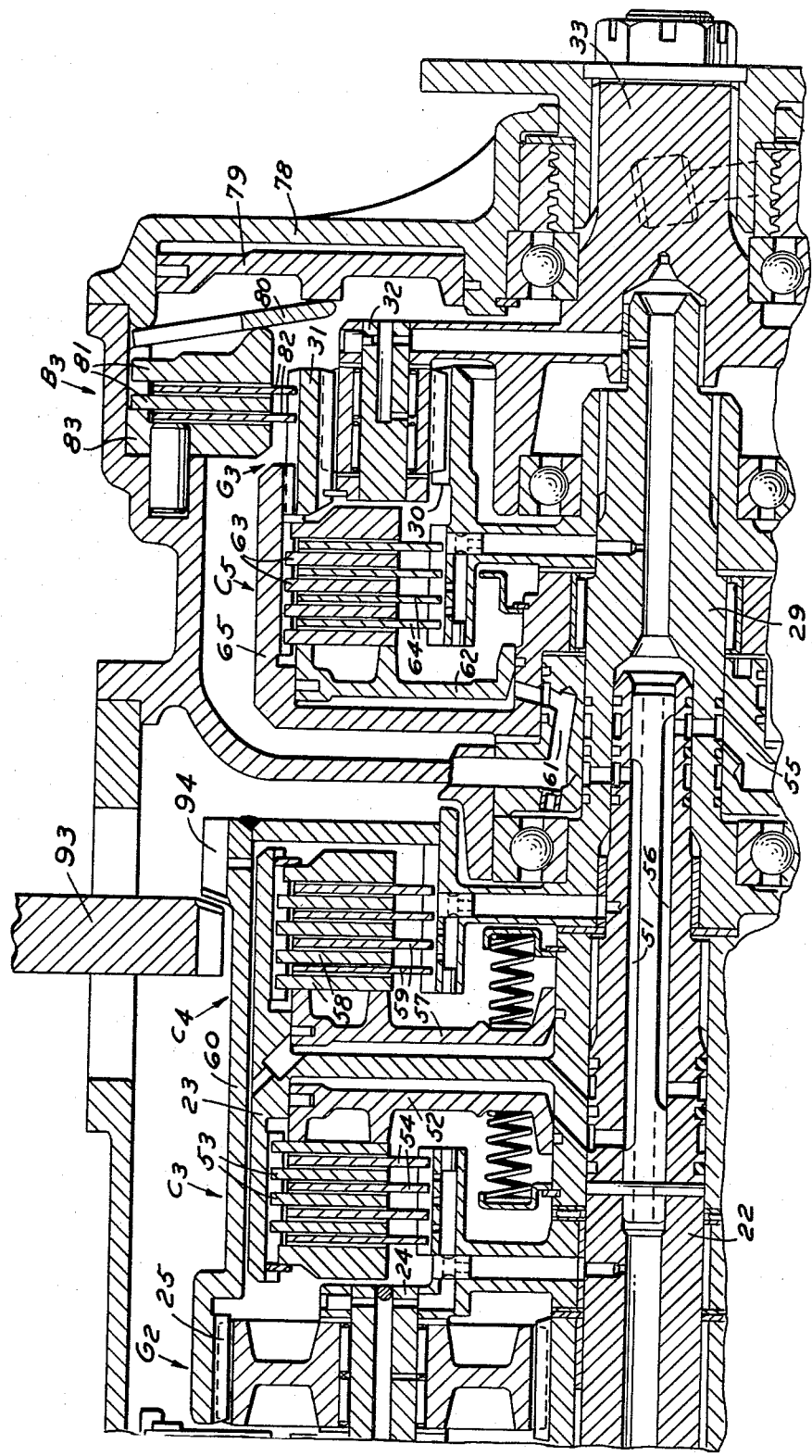

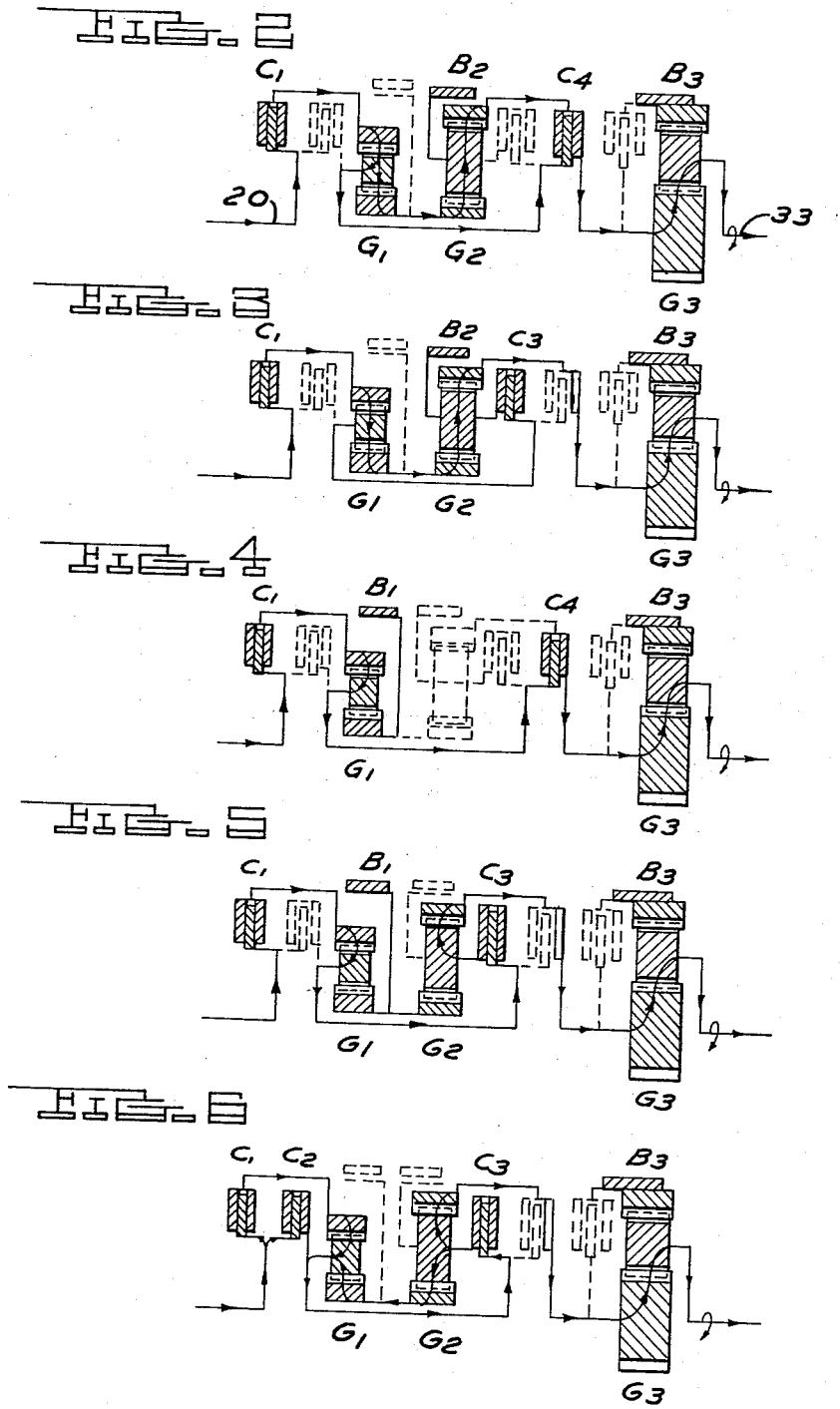

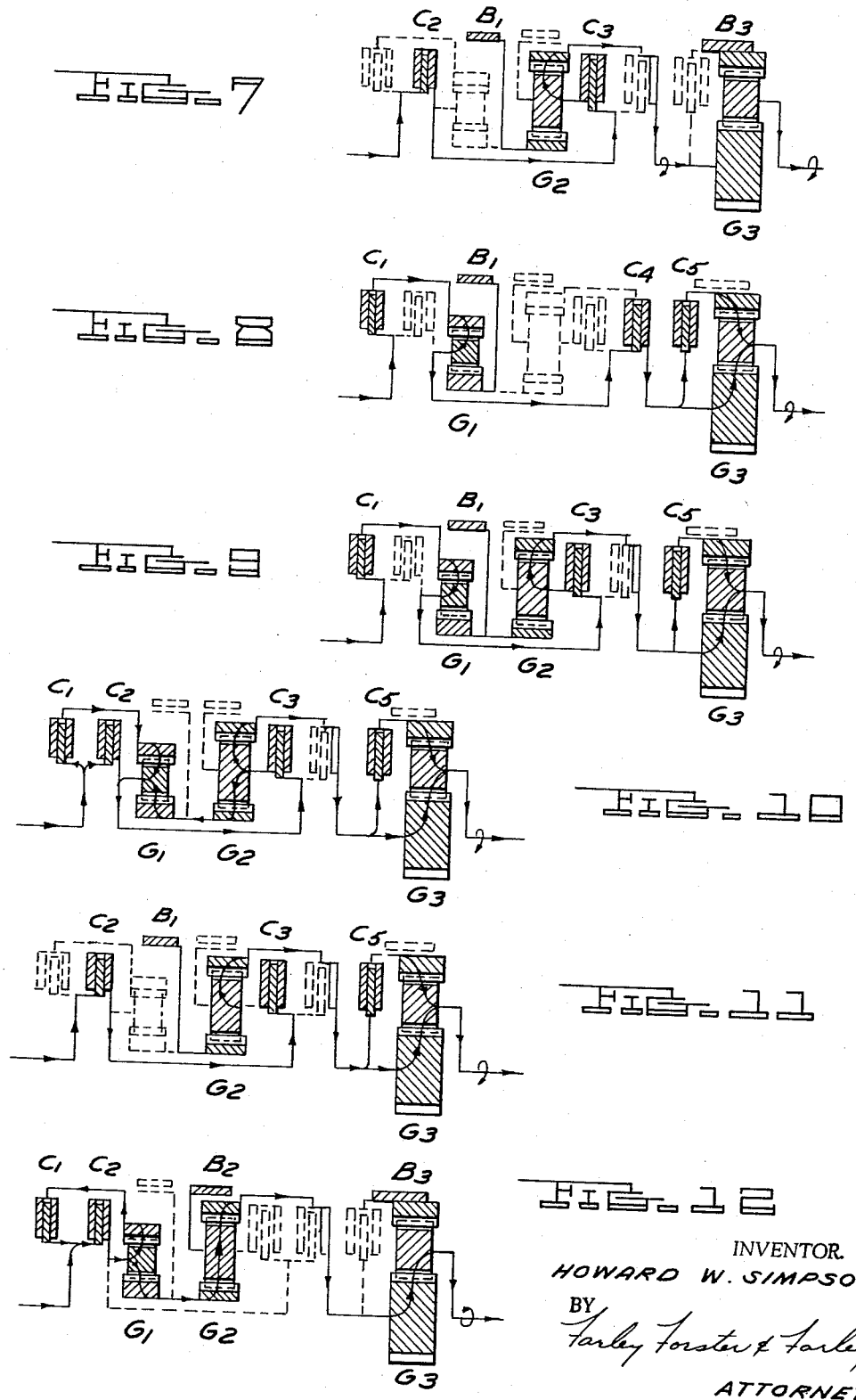

INVENTOR.
HOWARD W. SIMPSON
BY
Farley Forster & Farley
ATTORNEYS

May 16, 1967    H. W. SIMPSON    3,319,491
HEAVY DUTY PLANETARY TRANSMISSION
Filed Dec. 24, 1963    6 Sheets-Sheet 6
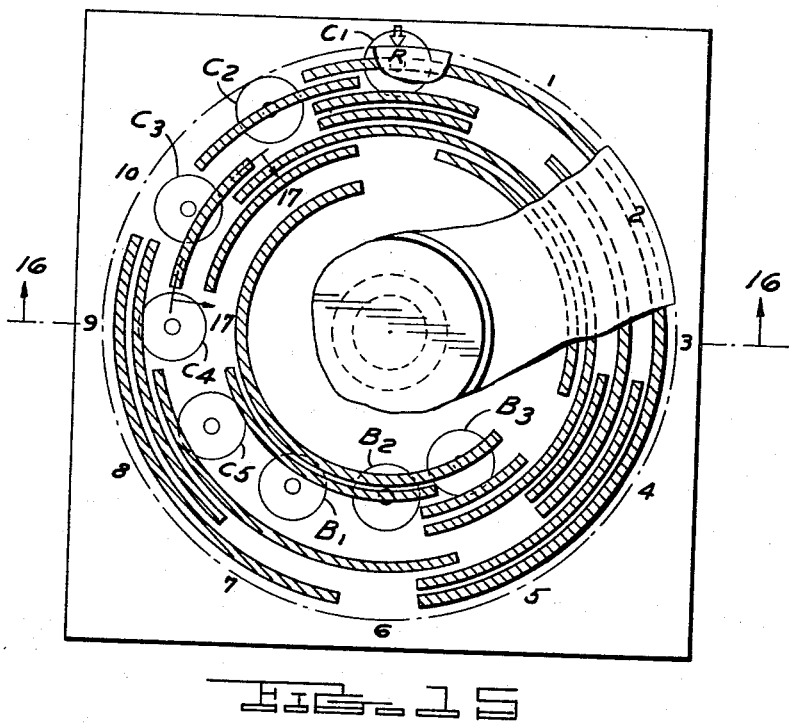
FIG. 15
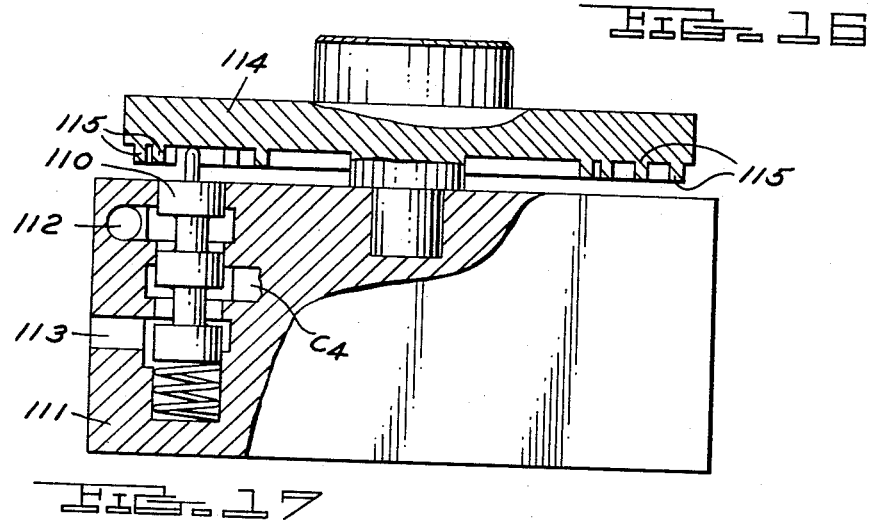
FIG. 16
FIG. 17
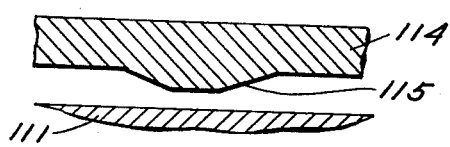
INVENTOR.
HOWARD W. SIMPSON
BY
Farley Forster & Farley
ATTORNEYS United States Patent Office 3,319,491
Patented May 16, 1967

3,319,491
HEAVY DUTY PLANETARY TRANSMISSION
Howard W. Simpson, 730 Crescent Drive,
Dearborn, Mich. 48124
Filed Dec. 24, 1963, Ser. No. 333,094
13 Claims. (Cl. 74—740)

This invention relates to improvements in multi-speed transmissione employing planetary gearing and more particularly to heavy duty transmissions suitable for use in trucks and other heavy road or off-road vehicles requiring a relatively high overall ratio spread and relatively close spacing of individual speed ratios.

Certain vehicles, such as long distance hauling trucks, require transmissions which have small ratio steps so as to keep the engine at its governed top speed throughout all normal grades encountered and thus assure maximum performance. At the same time a total ratio coverage of about 12:1 or more is needed to take care of wide variations of load and road conditions. A 12:1 total ratio with uniform ratio steps of 22–24 percent requires 13 speed ratios; steps of 25–27 percent require 12 speeds; and steps of 28–30 percent require 11 speeds. However, it has been found that the step between second and low speeds can be at least twice as great as indicated above. This is because the lowest ratio is only used in unusual conditions as a creeper gear. Likewise, there can be a larger step between second and third speed than between the others without sacrificing performance appreciably because second speed is usually used only in starting from a standstill or on steep grades. Thus, by having larger steps in the two lowest ratios, the same ratio coverage can be obtained with only ten speeds which will accomplish practically the same results as 12 or 13 speeds and will require fewer shifts and simpler controls.

In my present construction I provide 10 speeds with three planetary sets of the simple fully balanced internal-external gear type. Uniform steps in the 10-speed combination are obtained in all but the two lowest speeds with progressively larger steps between third and second speeds and between second and low speeds respectively. Two planetary trains are arranged to yield 6 speeds, the top speed being an overdrive; a third range gear train behind the first two functions either as a reduction ratio or a direct drive to provide a potential total of 12 speeds. The reduction in the auxiliary set is preferably such that it funtcions in the six lowest speeds only.

In the 10-speed combination downshifts are in the front two sets from overdrive, down to the 4th speed from the top; the next downshift is back to high in the front gears and to low in the auxiliary set; shifts from there on down are in the front gears and extend through the six ratios, ending in a low low; thus, the two lowest reductions produced by the front gears are bypassed in the fast range. For an alternative 7-speed combination suitable for use in lightly loaded trucks or other vehicles where somewhat larger ratio steps are permissible, an additional three speeds may be omitted (4th, 6th and 10th) providing relatively uniform ratio steps approximately twice as great as in the 10-speed combination.

In my previous transmission work I found it possible to obtain six useful forward speed ratios from two simple planetary gear sets, it being a characteristic of such transmission, however, that the ratio spread between 3rd and 2nd was somewhat greater and the ratio spread between 2nd and low speeds still greater than relatively uniform ratio steps between the remaining successive speeds. Such relatively larger steps, while acceptable and even desirable, in the lowest two speeds of a heavy-duty transmission tended to render such 6-speed transmission unsuitable for combination with a range gear for repeating ratios of the two planetary sets in a high range for increasing the number of speeds since the repetition of the large ratio spread between 1st and 2nd and 2nd and 3rd in the high range (representing middle speed ratios of the overall transmission) were entirely unsuitable and many attempts to find modified gear sizes to obtain suitable ratio steps in the low speeds for repetition in the high range met with continual failures since all such attempts resulted in wide variations of steps in the remaining ratios which were equally unsuitable. I finally discovered, however, that an ideal 10-speed transmission could be produced by choosing a range gear ratio such as to provide a desired step between 6th and 9th speeds (of the total of 12 speeds available) of the same order of ratio spread as was obtainable in the higher four speeds of the basic two planetary sets 6-speed transmission combined with the omission of the 7th and 8th of the potential 12 speeds corresponding to low and 2nd in the low range.

I have also found that a valve control may be provided which will produce successive engagement of all 6 speeds in the low range while automatically omitting the lowest two speeds in the high range.

In providing a planetary gear transmission with this number of speed ratios a relatively large number of clutch and brake elements are necessarily employed along with the three planetary gear sets. Since the overall length of the transmission is a matter of critical concern, particularly where used in tractor cabs for long highway trailers, in order to meet critical overall length dimension requirements for a typical heavy-duty truck transmission I found it necessary to nest certain of my friction elements with radial rather than axial spacing which I discovered was possible to do by arranging the inner smaller diameter friction element to be that requiring the least torque capacity.

Accordingly, one object of this invention is to provide a multi-speed planetary transmission having three sets of planetary gears in which all but the lowest speed ratios are in approximately equal geometric progression; another object is to provide a multi-speed planetary transmission in which the ratio steps of the two lowest speeds are greater than those of the other speeds; another object is to provide a multi-speed transmission in which the ratio step between low and 2nd speed is greater than the step between 2nd and 3rd speed; another object is to provide a 10-speed planetary transmission having approximately equal steps between the top 8 speeds, a larger step between 3rd and 2nd speed, and a still larger step between 2nd and low speeds; another object is to provide a 7-speed planetary transmission utilizing the same gear sets and friction elements as the 10-speed planetary transmission, providing approximately equal relatively larger steps; another object is to provide a 2-range, multi-speed transmission in which two of the potential speeds in the top range are bypassed or omitted to obtain desired steps through both ranges; another object is to provide a control system wherein the regular progression of speeds automatically bypasses two of the potential speeds in the top range; another object is to provide a heavy-duty planetary transmission employing three axially aligned planetary gear sets with friction clutch and brake elements for producing multiple speed ratios in two ranges wherein certain friction elements are nested one within the other in the same radial plane in order to conserve axial apace; another object is to so arrange such nested friction elements that the higher torque requirements are allocated to the outermost friction element; another object is to provide alternative power take-off options in the same basic transmission. These and other objects will become more apparent from the following description together with the accompanying drawings showing a preferred embodiment of my invention wherein:

FIG. 1a is a partial elevation, in section of the upper forward half of the transmission;

FIG. 1b is a partial overlapping elevation in section of the upper rear half of the transmission;

FIGS. 2–12 are similar schematic diagrams of the transmission identifying the active planetary and friction elements for the respective 10 forward and 1 reverse speed ratios;

FIG. 15 is a view similar to FIG. 13 showing a modified valve control employing individual spool valves for applying and releasing fluid pressure to the various friction elements with a rotary cam for actuating the respective spool valves.

FIG. 16 is a sectional view taken along the line 16—16 of FIG. 15; and

FIG. 17 is a fragmentary sectional view taken along the line 17—17 of FIG. 15.

Figure 13:
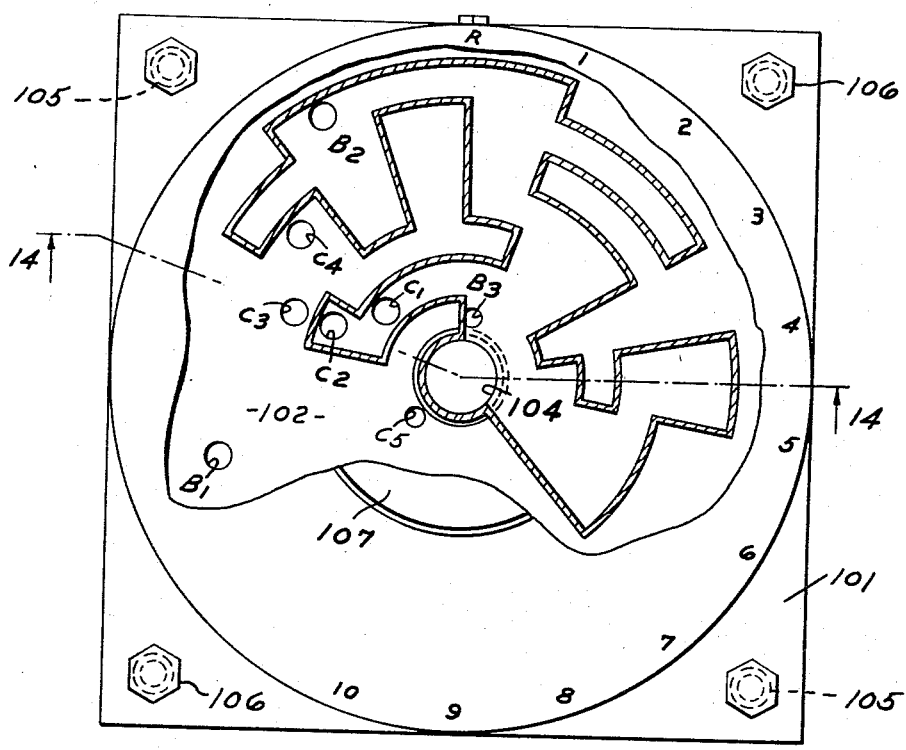
FIG. 13 is a sectional view taken along the line 13—13 of FIG. 14 of a valve control adapted to engage and release the various friction elements as required in the various speed ratios.

As shown in FIGS. 1a, 1b the transmission includes three simple planetary gear sets G1, G2 and G3, five selectively engageable fluid pressure operated friction clutches C1, C2, C3, C4 and C5 and three selectively engageable fluid pressure operated brake units B1, B2 and B3, which are adapted to provide 10 forward and 1 reverse speed ratios. The input shaft 20 is drivingly splined to housing 21 for clutch C2, the engagement of which drives shaft 22 splined to housing 23 for clutches C3 and C4, the engagement of which respectively connect shaft 22 to the carrier 24 and ring gear 25 of the gear set G2. Engagement of clutch C1 connects the input shaft 20 to the housing 26 drivingly connected through drum 27 to the ring gear 28 of the first gear set G1. A third shaft 29 is splined to the sun gear 30 of the rear gear set G3 which may be locked up by coupling the sun gear 30 to the ring gear 31 of such gear set by engagement of clutch C5, the carrier 32 of such gear set being integrally connected to the output shaft 33.

Engagement of brake B1 holds the integrally connected sun gears 34 and 35 of the first two gear sets G1, G2; engagement of brake B2 holds the carrier 36 of the second gear set G2; and engagement of brake B3 holds the ring gear 31 of third gear set G3.

Referring to clutch C1 in FIG. 1a, the housing 26 is rotatably supported on the hub of stationary support 40 mounted on wall 41 bolted to the bell housing 42. Pressure from passage 43 actuates the annular piston 44 engaging clutch plates 45 splined to the housing 26 with clutch plates 46, splined to the housing 21. Referring to clutch C2, oil pressure in passage 47 actuates piston 48 to similarly engage clutch plates respectively splined to housing 21 and the carrier 49 of the gear set G1 which is drivingly connected through splines 50 to shaft 22. Referring to clutch C3 in FIG. 1b pressure from passage 51 actuates piston 52 to engage clutch plates 53, 54 splined respectively to housing 23 and carrier 24 of the gear set G2. Clutch C4 is actuated by oil pressure from stationary port 55 conducted through shaft 29 and shaft 22 to passage 56 communicating with piston 57 for engaging clutch plates 58, 59 splined respectively to the housing 23 and the drum 60 integrally connected to the ring gear 25 and shaft 29. Referring to clutch C5 oil pressure in passage 61 actuates piston 62 to engage clutch plates 63, 64 splined respectively to housing 65, in turn splined to ring gear 31, and to an extension of sun gear 30 of the rear gear set G3.

Referring to brake B1 pressure from passage 67 in stationary wall support 68 actuates piston 69 which through levers 70 engages clutch plates 71, 72 splined respectively to the stationary wall support 68 and the integral sun gears 34, 35 of the respective gear sets G1 and G2. Referring to brake B2 pressure from a stationary passage (not shown) similar to 67 actuates piston 73 which through levers 74 engages plates 75, 76 respectively splined to the support wall 68 and carrier 36 of the gear set G2. Referring to brake B3 shown in FIG. 1b pressure from a stationary passage (not shown) in the end wall 78 actuates piston 79 acting through levers 80 to engage clutch plates 81, 82 splined respectively to stationary insert 83 and the ring gear 31 of the rear gear set G3.

Referring to FIG. 1a additional elements not previously described include a pump 85 driven by the input shaft 20 and a retarder paddle wheel 86 drivingly connected to the input shaft 20 providing fluid coupling drag reaction with vanes 87, 88 formed in the stationary walls 41, 89 when oil is admitted to the enclosure therebetween. A power take-off gear 90, slidably mounted on a shaft (not shown) is engageable with gear 91, splined to the carrier 34 of the gear set G2.

Referring to FIG. 1b, an alternative power take-off gear 93 may be slidably mounted on a shaft (not shown) to engage gear 94 integrally formed on a flange of the drum 60. As will be apparent from subsequent description of the gear ratios, respective power take-off gears 91 and 94 have substantially different ratio characteristics and while in normal transmission applications only a single power take-off gear will be required, it is contemplated that the housing may be designed for optional power take-off as well as the gear blank for the alternative power take-off gear 94 which may be machined only in transmissions employing the rear power take-off.

Refering to FIGS. 2–12 showing schematically the respective 10 forward and 1 reverse speed ratios of the transmission with the inactive elements of each ratio shown in dotted line it will be seen that low speed is effected, as shown in FIG. 2, by the engagement of clutches C1 and C4 and brakes B2 and B3. This results in an input to the ring gear of the first gear set G1, a backward rotation of the integral sun gears of the gear sets G1 and G2, a reduction output from the carrier of the first gear set G1, and ring gear of the second gear set G2 to the sun gear of the third gear set G3 and a further reduction in the third gear set. Using gear sizes having teeth as shown in the following table, a reduction through the first and second gear sets G1, G2 of 3.95 and further reduction through the third gear set G3 of 2.507 produces an overall low speed reduction of 9.99:1:

|  | G1 | G2 | G3 |
| --- | --- | --- | --- |
| Ring Gear | 74 | 126 | 101 |
| Sun Gear | 42 | 30 | 67 |
| Pinions | 17 | 48 | 17 |

Referring to FIG. 3 in second speed clutch C4 is released and clutch C3 applied thereby reducing the carrier speed of the first gear set G1 to zero producing an overall reduction ratio of 5.97:1. In third speed, as shown in FIG. 4, clutch C3 and brake B2 are released while clutch C4 and brake B1 are applied, thereby combining the reduction ratio of the first gear set G1 with the reduction ratio of the third gear set G3 to produce an overall forward reduction of 3.93:1. In 4th speed by releasing clutch C4 and applying clutch C3 the previous reduction ratio through the first gear set G1 is modified by an overdrive through the second gear set G2 to produce an overall reduction ratio of 3.17:1. In 5th speed, as shown in FIG. 6, the release of brake B1 and application of clutch C2 locks up both of the first two gear sets G1 and G2 providing an overall reduction ratio of 2.507:1. In 6th speed, as shown in FIG. 7, the release of clutch C1 and application of brake B1 produces an overdrive through the second gear set G2 which, combined with the reduction of gear set G3, produces an overall reduction ratio of 2.02:1. In the remaining forward speeds, as shown in FIGS. 8, 9, 10 and 11, the rear set G3 is locked up by release of brake B3 and application of clutch C5, while the previous ratios of the 3rd, 4th, 5th and 6th speeds only are repeated in the first two gear sets G1, G2, thereby bypassing the overlapping ratios which would otherwise result if the 1st and 2nd speed ratios in the first two gear sets G1, G2 were repeated, and producing successive additional ratios of 1.5675:1, 1.265:1, 1:1 and .807:1. This, it will be noted, produces 10 successive forward speed ratios with successive percentage steps therebetween of approximately 67, 52, 24, 26, 24, 29, 24, 26 and 24. The initial two large steps of 67 and 52 percent each are not only acceptable but actually desirable since the first speed is normally used primarily as a creeper gear under unusual conditions and the second speed is usually used only when starting from a standstill or on extremely steep grades. Even steps in the order of 25 percent are desirable for normal use in progressively raising the vehicle speed up to highway cruising or in meeting varying requirements of matching of engine and vehicle speeds under different grade conditions.

The advantage of this arrangement over any arrangement of the same three gear sets wherein the lowest 2 speed ratios of the first two gear sets are repeated in high range may be appreciated when it is considered that whatever range ratio were employed to provide a desired step between 6th speed low range and 1st speed repeated in high range, the next step would necessarily be in the order of 67 percent leaving an unacceptable "hole" in the overall mid-ratios where uniform steps in the order of 25 percent are most critically required. This, the normal inclination to make full use of 12 potential ratios by repeating all six ratios of the first two sets in the high range leads to unacceptable ratio steps however the gear sizes may be varied. This problem has been solved by the omission of the ratios involving unacceptably large steps in the high range by selecting a range gear ratio such as to produce a desired step between the highest 6th speed of the low range and the 3rd speed ratio of the low range in the first two planetary sets repeated in the high range, the resulting 10-speed transmission having an overall ratio spread in the order of 12.28:1 with substantially uniform steps in the order of 25 percent between the top 8 speeds. This provides a highly acceptable and desirable solution to the inherent problem of providing a large number of relatively uniform ratio steps with planetary gearing.

A reverse speed ratio of 10.52:1, as illustrated in FIG. 12, is obtained by engaging clutches C1, C2 and brakes B2, B3 which locks up the front planetary gear set G1 producing a reverse reduction with sun gear input and ring gear output through the second gear set G2 multiplied by the 2.507 reduction in the third gear set G3.

Figure 14:
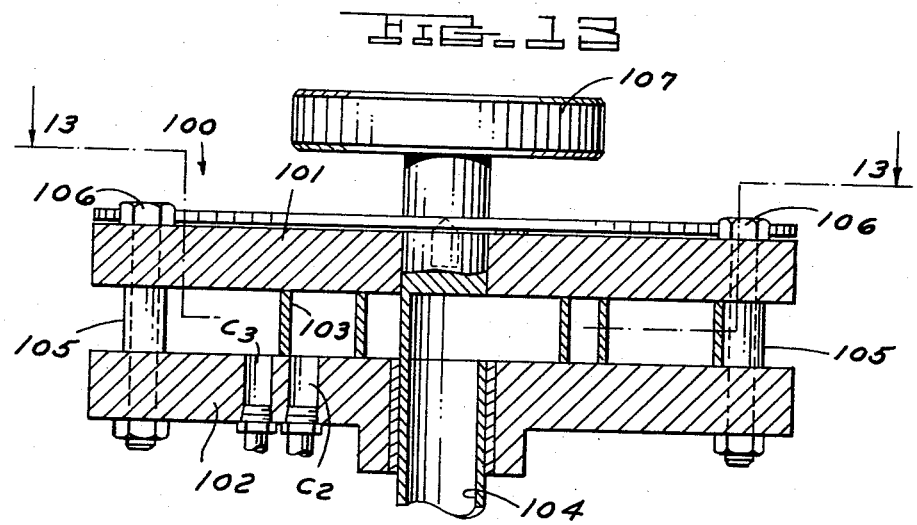
FIG. 14 is a sectional elevation taken along the line 14—14 of FIG. 13.

A single valve control for effecting fluid pressure application and release of the respective clutch and brake elements as required in effecting successive shifts, as shown in FIGS. 13 and 14, includes a valve body 100 having an upper flat plate 101, a lower plate 102 and an intermediate rotatable valve element 103, the interior of which communicates with a fluid pressure inlet 104. The plates are held in spaced relationship by four tubular spacers 105 through which pass tensioning bolts 106. As best shown in FIG. 13 the pressurized interior of the valve element 103 communicates with passages C1, C2, B2 and B3 in the lower plate leading to the corresponding clutch and brake elements for effecting the reverse speed ratio and it will be seen that counter-clockwise rotation of the control knob 107 in 20° increments, as shown by the successive numbers 1 through 10, will move the control element 103 to pressurize and exhaust the respective passages as required to effect each of the 10 forward speed ratios automatically omitting a repetition of the lowest 2 speed ratios of gear sets G1 and G2 in the high range of gear set G3 while repeating the 3rd, 4th, 5th and 6th speed ratios of the gear sets G1, G2 in the high range of gear set G3 to produce the 7th, 8th, 9th and 10th overall speed ratios.

The alternative control illustrated in FIGS. 15, 16 and 17 employs 8 conventional spool valves 110 in a valve body 111 for connecting respective pressure and exhaust passages 112, 113 to the respective passages such as C4, associated with the corresponding clutch and brake elements of the transmission. A rotatable cam plate 114 is adapted to release the valve to exhaust position as shown in FIG. 16 or depress same to a pressurizing position through the action of ramp cams 115 as required to effect application and release of the various clutches and brakes associated with the valves having corresponding symbols. In this case successive ratios are effected by 30° increments of rotation of the cam plate 114 in a counter-clockwise direction as seen in FIG. 15.

Referring again to FIGS. 1a and 1b, it will be seen that the front power take-off gear 91 will deliver the ratios of the front carrier 49 to the power take-off gear 90 when engaged therewith which ratios are 3.95 in first speed, zero in second speed, 1.57 in both third and fourth speeds and 1:1 in fifth and sixth speeds, 1.57 in seventh and eighth speeds and 1:1 in ninth, tenth and reverse speeds.

The rear power take-off gear 94 which is integral with the ring gear 25 of the second gear set G2 provides a greater range of ratios including 3.95, 2.38, 1.57, 1.265, 1.00, .807 and 4.2 reverse in the respective first six speeds and reverse with the third, fourth, fifth and sixth ratios being repeated in the upper four speeds of the high range. Since different end uses of the transmission may make one or the other of the power take-offs more desirable while production quantities may not warrant tooling for separate cases 42 or ring gear drums 60, it is contemplated that common cases may be provided having covers (not shown) for the access openings for whichever of the power take-off gears 90 or 93 is not used and that all drums 60 may be provided with flanges serving as gear blanks for the gear 94, such gear being machined only in transmissions employing a rear power take-off.

Referring to FIGS. 1a, 4, 5, 7, 8, 9 and 11 it will be seen that the brake B1 is required to hold only sun gear reaction torque of a lower order than the carrier reaction torques of the second gear set brake B2, the maximum torque on the brake B1 for gear sizes indicated being in the order of one-half engine torque, in third and seventh speeds, while the torque on the brake B2 is in the order of three times engine torque in low and five times engine torque in reverse. By arranging the brake B1 having the lower torque requirement on the inside and brake B2 having the higher torque requirement on the outside of nested brake housings employing a common drum 68 for carrying the stationary plates 75, 71 it has been found possible to shorten the transmission by the width of one brake assembly without unduly increasing the case diameter. Since axial transmission length is frequently at a premium, particularly in truck transmissions using a foreshortened drive line to a maximize available space for payload trailer size, the several inches saved by this construction represent an important factor in providing a commercially acceptable truck transmission.

While a particular preferred embodiment of a ten-speed heavy duty transmission has been shown and described above in detail together with alternative control systems therefor it will be understood that numerous modifications might be resorted to without departing from the scope of the invention as defined in the following claims.

I claim:

1. A variable speed transmission for a self-propelled vehicle comprising first and second planetary gear sets, means including gear proportions and selectively engagable clutch and brake connections for establishing progressive forward speed drive ratios through said gear sets including a relatively large ratio step between the lowest and second speed ratios, a third planetary gear set, means including gear proportions and selectively engagable clutch and brake connections for said third planetary gear set for alternatively providing a low speed range wherein a forward speed reduction ratio may be combined with the speed ratios obtained in the first two planetary sets or a high range drive wherein the ratios established in the first two planetary sets are not modified by the third planetary set, the highest combined speed ratio of said three planetary sets in low speed range exceeding said lowest speed ratio of said first and second planetary sets and being less than another speed ratio of said first and second planetary sets by a relatively small ratio step, and means for producing a progressive sequence of ratio steps through said low and high speed ranges utilizing said lowest speed ratio of said first two sets only in said low speed range thereby eliminating said relatively large ratio step in said high speed range.

2. A variable speed transmission for a self-propelled vehicle comprising first and second planetary gear sets, means including gear proportions and selectively engageable clutch and brake connections for establishing progressive forward speed drive ratios through said gear sets including relatively large ratio steps between the lowest, second and third speed ratios, a third planetary gear set, means including gear proportions and selectively engageable clutch and brake connections for said third planetary gear set for alternatively providing a low speed range wherein a forward speed reduction ratio may be combined with the speed ratios obtained in the first two planetary sets or a high range drive wherein the ratios estabilshed in the first two planetary sets are not modified by the third planetary set, the highest combined speed ratio of said three planetary sets exceeding the lowest and second speed ratios of said first and second planetary sets and being less than the third speed ratio of said first and second planetary sets by a relatively small ratio step, and means for producing a progressive sequence of ratio steps through said low and high speed ranges utilizing said lowest and second speed ratios of said first two sets only in said low speed range thereby eliminating said relatively large ratio steps in said high speed range.

3. A variable speed transmission for a self-propelled vehicle comprising a power input member, a load member, three axially aligned planetary gear sets interposed therebetween, means including gear proportions and selectively engageable clutch and brake connections for establishing six progressive forward speed drive ratios through two of said planetary sets including relatively larger ratio steps between first and second and second and third speeds and relatively uniform smaller ratio steps between the remaining speed ratios, means including gear proportions and selectively engageable clutch and brake connections for said third planetary set for alternatively providing a low speed range wherein a forward speed reduction ratio may be combined with the speed ratios obtained in the first two planetary sets or a high range drive wherein the ratios established in the first two planetary sets are not modified by the third planetary set, the highest combined speed ratio of said three planetary sets exceeding the lowest and second speed ratios of said first and second planetary sets and being less than the third speed ratio of said first and second planetary sets by a relatively small ratio step, and means for producing a progressive sequence of ratio steps through said low and high speed ranges utilizing said first and second speed ratios of said first two sets only in said low speed range thereby eliminating said relatively large ratio steps in said high speed range.

4. A variable speed transmission for a self-propelled vehicle comprising three planetary gear sets, means including gear proportions and selectively engagable clutch and brake connections providing ten progressive forward speed ratios through said three planetary gear sets with an overall ratio spread in the order of 12 to 1 including relatively uniform ratio steps between the successive highest eight speed ratios and relatively larger (in the order of double) ratio steps between the successive lowest three speed ratios.

5. A variable speed transmission as set forth in claim 1, wherein said first two planetary gear sets are differentially connected to produce said lowest speed ratio.

6. A variable speed transmission as set forth in claim 2, wherein said first two planetary gear sets are connected in differential relation to produce said lowest speed ratio and in reverse-overdrive to reverse-reduction relation to produce said second speed ratio.

7. A variable speed transmission as set forth in claim 6, wherein the highest speed ratio of said first two planetary gear sets is an overdrive ratio.

8. A variable speed transmission as set forth in claim 6, wherein the third speed ratio of said first two planetary gear sets is produced by a forward reduction ratio through one of said planetary sets.

9. A variable speed transmission as set forth in claim 8, wherein the highest speed ratio in said first two planetary gear sets is a forward overdrive ratio.

10. A variable speed transmission as set forth in claim 9, wherein said first two planetary gear sets are connected in forward reduction to forward overdrive relation to produce a fourth forward reduction speed ratio.

11. A variable speed transmission as set forth in claim 8, wherein said first and second planetary gear sets include fifth and sixth direct drive and overdrive forward speed ratios.

12. A variable speed transmission as set forth in claim 2, wherein additional relatively uniform smaller ratio steps are provided in said first two planetary sets and wherein the ratio of said third planetary set combined with the highest speed ratio of said first two sets provides a progressive ratio step relative to the third speed ratio of said first two sets in high range having the same order of magnitude as said relatively uniform smaller ratio steps.

13. A variable speed transmission as set forth in claim 12, wherein said highest speed ratio of said first two sets is an overdrive ratio of smaller magnitude than the reduction ratio of said third planetary set.

References Cited by the Examiner

UNITED STATES PATENTS

| | | | |
|---|---|---|---|
| 1,231,529 | 6/1917 | Pollard | 74—761 |
| 1,256,372 | 2/1918 | Rowledge | 74—761 |
| 1,407,643 | 2/1922 | Desmoulins | 74—760 |
| 2,214,335 | 9/1940 | Kurti | 74—761 |
| 2,518,824 | 8/1950 | Simpson | 74—763 |
| 2,743,739 | 5/1956 | Mansen | 137—624.18 X |
| 2,873,625 | 2/1959 | Simpson | 74—763 |
| 2,923,178 | 2/1960 | Miller | 74—15.86 |
| 2,926,543 | 3/1960 | Holdeman et al. | 74—761 X |
| 2,930,258 | 3/1960 | Flinn | 74—759 X |
| 2,970,571 | 2/1961 | Pecchenino | 137—624.18 X |
| 2,971,385 | 2/1961 | Miller | 74—15.86 |
| 2,975,656 | 3/1961 | Haverlender | 74—15.86 X |
| 2,980,393 | 4/1961 | Bauerlein | 137—624.18 X |
| 3,074,431 | 1/1963 | Schwartz et al. | 137—624.18 X |
| 3,112,630 | 12/1963 | Anderson et al. | 137—624.18 X |

FOREIGN PATENTS

| | | |
|---|---|---|
| 76,045 | 4/1919 | Austria. |
| 904,417 | 11/1945 | France. |
| 551,294 | 5/1932 | Germany. |
| 1,031,647 | 3/1956 | Germany. |

DAVID J. WILLIAMOWSKY, Primary Examiner.

J. R. BENEFIEL, Assistant Examiner.